(12) United States Patent
Mecrow

(10) Patent No.: US 7,205,694 B2
(45) Date of Patent: Apr. 17, 2007

(54) CONTROL OF A SWITCHED RELUCTANCE DRIVE

(75) Inventor: Barrie Charles Mecrow, Whitley Bay (GB)

(73) Assignee: Switched Reluctance Drives Limited, Harrogate (GB)

( * ) Notice: Subject to any disclaimer, the term of this patent is extended or adjusted under 35 U.S.C. 154(b) by 181 days.

(21) Appl. No.: 10/426,276

(22) Filed: Apr. 30, 2003

(65) Prior Publication Data

US 2004/0070301 A1    Apr. 15, 2004

(30) Foreign Application Priority Data

Apr. 30, 2002    (GB) ................ 0209794.7

(51) Int. Cl.
*H02K 19/20*    (2006.01)
(52) U.S. Cl. ....................... 310/168; 310/216
(58) Field of Classification Search ............... 310/168, 310/184, 254, 179, 180, 216
See application file for complete search history.

(56) References Cited

U.S. PATENT DOCUMENTS

| | | | |
|---|---|---|---|
| 5,010,267 A | | 4/1991 | Lipo et al. |
| 5,726,516 A | * | 3/1998 | Randall ...................... 310/261 |
| 5,753,989 A | * | 5/1998 | Syverson et al. ............ 310/114 |
| 5,866,964 A | * | 2/1999 | Li ............................... 310/198 |
| 5,874,795 A | * | 2/1999 | Sakamoto .............. 310/156.12 |
| 5,973,431 A | * | 10/1999 | Li et al. ..................... 310/168 |
| 6,194,805 B1 | * | 2/2001 | Heese et al. ................ 310/166 |
| 6,313,558 B1 | * | 11/2001 | Abukawa et al. ........... 310/254 |
| 6,442,535 B1 | * | 8/2002 | Yifan .............................. 706/4 |
| 6,495,941 B1 | | 12/2002 | Nishimura |

FOREIGN PATENT DOCUMENTS

| | | |
|---|---|---|
| EP | 0504093 A1 | 9/1992 |
| EP | 0 818 870 A1 | 1/1998 |

OTHER PUBLICATIONS

Mecrow, B.C., et al., "The Design of Switched Reluctance Motors with Segmental Rotors," Department of Electrical & Electronic Engineering, University of Newcastle Upon Tyne, Proceedings of ICEM 2002, Aug. 2002.

Mecrow, B.C., et al., "Segmental rotor switched reluctance motors with single-tooth windings"; IEE Proc.-Electr. Power Appl., vol. 150, No. 5, Sep. 2003, pp. 591-599.

EPO Searc Report (Forms 1507.0, 1503 and P0459) mailed by the European Patent Office on Jun. 7, 2006 in EP Application No. 03252677.4, 3 pages.

* cited by examiner

*Primary Examiner*—Darren Schuberg
*Assistant Examiner*—Nguyen N. Hanh
(74) *Attorney, Agent, or Firm*—Haynes and Boone, LLP

(57) ABSTRACT

A switched reluctance machine has a stator which has an array of alternate wide and narrow poles around its inner circumference. Coils are wound around the wide poles only. The rotor includes segments of soft magnetic material carried on a non-magnetic core. The segments are so proportioned at the air gap that the flux produced by one stator coil passes through two or more segments and returns through the adjacent narrow poles. The machine is capable of producing a high output.

9 Claims, 4 Drawing Sheets

CONTROL OF A SWITCHED RELUCTANCE DRIVE

CROSS-REFERENCE TO RELATED APPLICATION

The subject matter of this application is related to the subject matter of British Application No. 0209794.7, filed Apr. 30, 2002, priority to which is claimed under 35 U.S.C. § 119 and which is incorporated herein by reference.

BACKGROUND OF THE INVENTION

1. Field of the Invention

The present invention relates to switched reluctance machines, and relates particularly to switched reluctance machines with segmented rotors.

2. Description of Related Art

Switched reluctance electrical motors are known in which a stator having a series of circumferentially arranged stator poles of soft magnetic material has current-carrying coils wound on the poles. A rotor having rotor poles of magnetic material is rotatably arranged with respect to the stator and seeks to align itself with the magnetic field generated by the coil or coils which are energized. The coils of the stator poles are energized to develop torque on the rotor in the desired sense relative to the stator.

The amount of torque generated by such machines is dependent upon the difference between the flux linking each turn of the excitation coils in the aligned (i.e. rotor and stator poles aligned) condition and the non-aligned (i.e. maximum non-alignment of rotor and stator poles) conditions. The aligned and unaligned flux linkage rises as the width of the stator pole arc rises as a proportion of the pitch of the stator poles, but once the arc of the stator poles becomes more than half of the spacing between adjacent rotor poles, there is always overlap between rotor and stator poles, even in the unaligned condition, which causes the unaligned inductance to rise rapidly. As a result, the peak torque generated by such machines is found to arise when the ratio of stator pole width to stator pole pitch is about 0.42.

In an attempt to overcome this limitation, switched reluctance machines have been produced in which the rotor, instead of having radially extending poles, is provided with magnetically separated segments of magnetic material which direct magnetic flux between adjacent stator poles. In these machines, little flux crosses the rotor diametrically. Such machines are described in "The design of switched reluctance motors with segmental rotors" by Mecrow, B. C., Finch, J. W., El-Kharashi, E. A. & Jack, A. G. in the Proceedings of ICEM 2002, International Conference on Electrical Machines, 25–28 Aug. 2002, Brugge, Belgium, incorporated herein by reference.

For a simplified arrangement in which the arc of the stator pole is equal to that of the rotor segments, it is found that as the ratio of stator pole width to pole pitch rises above 0.5, the useful torque generated by the machine continues to rise. However, at the same time, as the ratio of pole arc to pole pitch becomes higher, the slot between adjacent stator poles becomes very narrow, with the result that insufficient space is available to accommodate the excitation winding around each pole.

Attempts to overcome this problem are disclosed in U.S. Pat. No. 5,010,267 to Lipo and European Application No. 0504093 to Horst, both of which are incorporated herein by reference, in which each current carrying winding has a pitch of more than one stator pole, such that the windings of alternate phases (i.e. windings which are not energized at the same time) occupy adjacent slots between stator poles. This gives the advantage that the magnetic flux generated by two sides of any winding is not directed along a single tooth, as a result of which magnetic saturation in that tooth is avoided. However, prior art motors of this type suffer from the drawback that the windings extending over more than one stator pole need to be connected by long end connections, which increases the overall winding loss and causes the motor to occupy more space. This limits the extent to which the motor can be made at low cost.

SUMMARY OF THE INVENTION

Embodiments of the present invention seek to overcome the above and/or other disadvantages of the prior art.

According to one embodiment of the present invention, there is provided a switched reluctance machine comprising: a stator having a plurality of circumferentially arranged stator poles of soft magnetic material; a rotor, rotatably mounted within the stator, and having a plurality of circumferentially arranged, magnetically separated rotor segments of soft magnetic material, wherein each said rotor segment is adapted to direct magnetic flux between pairs of adjacent stator poles; and a plurality of coils provided around alternate stator poles and adapted to carry electric current to generate magnetic flux in said stator poles, wherein each said coil surrounds a single stator pole.

By providing an arrangement in which each coil only surrounds a single stator pole, and which coils are only provided on alternate poles, the alternate stator poles surrounded by coils can be made wider to accommodate the magnetic flux generated by the coil wound on the pole. The adjacent poles can be made thinner to create space in the stator to accommodate the windings and the adjacent wider stator poles. This therefore provides the advantage that the machine can be constructed of smaller size in relation to its mechanical performance than is possible with prior art machines. Furthermore, because the coils are short pitched, embracing a single stator pole, the end windings are short. This means that the losses normally associated with longer end windings are minimized so that a greater output from a given machine is possible.

In one embodiment, no two adjacent said stator poles are provided with said coils. The machine may comprise a plurality of sets of coils adapted to have maximum energization at different times. The coils are optionally arranged in diametrically opposite pairs. The number of stator poles is not an integer multiple of the number of rotor segments, and the number of rotor segments is not an integer multiple of the number of stator poles, according to embodiments of the invention.

In one embodiment, at least one said rotor segment is widened at a respective portion thereof facing the stator. The reluctance at the position of maximum inductance is minimized by increasing the lengths of the pole arcs of the stator and rotor segments. To this end, at least one said stator pole may be widened at a respective portion thereof facing the rotor. At least one said widened portion of a stator pole may have a taper angle of between 15° and 45° for example 20°.

BRIEF DESCRIPTION OF THE DRAWINGS

Embodiments of the invention will now be described, by way of example only and not in any limitative sense, with reference to the accompanying drawings, in which.

DETAILED DESCRIPTION OF PREFERRED EMBODIMENTS

Figure 1:
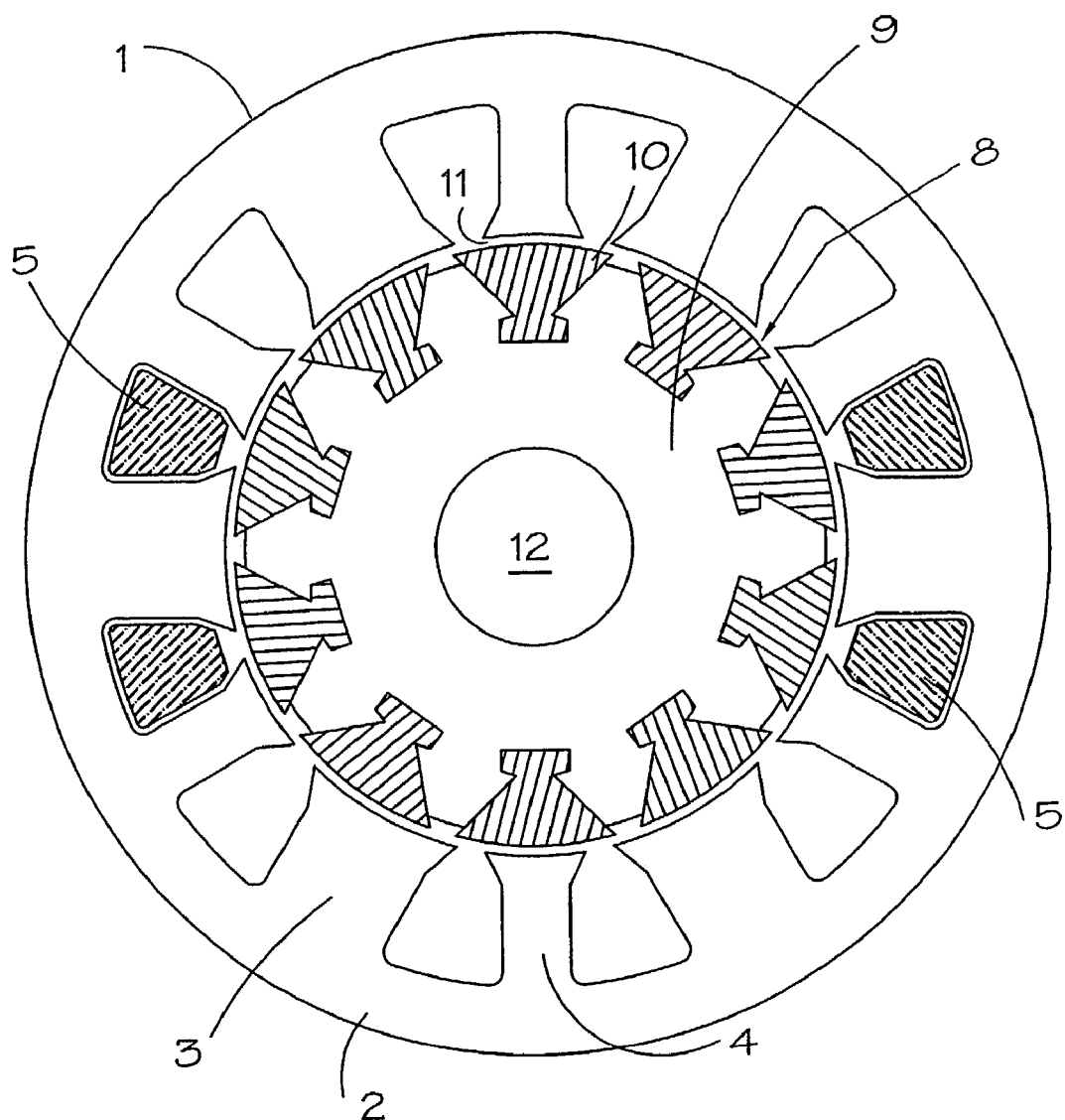
FIG. 1 shows a schematic cross-sectional view of a 3-phase switched reluctance machine, showing the coils of only one phase, according to an embodiment of the invention.
Figure 2:
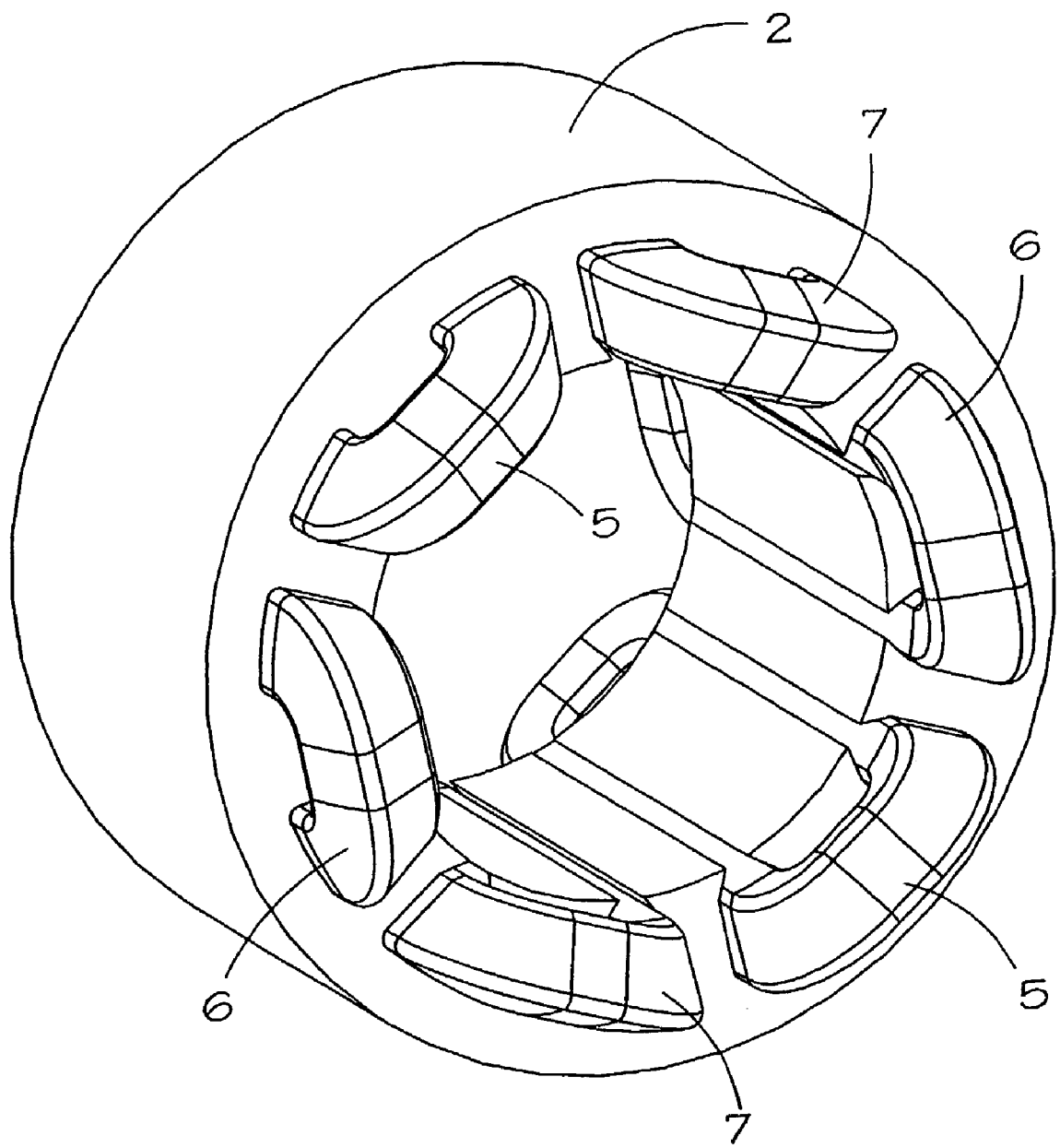
FIG. 2 shows a schematic perspective view the stator of the machine of FIG. 1, showing the coils of all three phases, according to an embodiment of the invention.

Referring to FIGS. 1 and 2, a 3-phase switched reluctance machine 1 includes a stator 2 having alternately arranged relatively wide first stator poles 3 and relatively narrow second stator poles 4. In the embodiment shown, the stator 2 is provided with six first stator poles 3 and six second stator poles 4. Each of the first stator poles 3 is wound with a respective excitation coil 5, 6, 7 for the three phases. The coils are arranged in diametrically opposite pairs 5, 6, 7 such that the coils of each diametrically opposite pair are electrically connected in series with each other. In an alternative embodiment, diametrically opposite coils are connected in parallel.

A rotor 8 includes a non-magnetic core 9. Ten magnetically separated rotor segments 10 of magnetic material are secured in longitudinal keyways in the core 9 so that they are circumferentially arranged and separated from the stator poles 3, 4 by an air gap 11. The rotor segments 10 are arranged to direct magnetic flux from a first stator pole 3 to an adjacent second stator pole 4 or vice versa, as shown most clearly in FIG. 3(a). For clarity, the rotor segments in FIG. 1 have been shown hatched. Also for clarity, the outer diameter of the non-magnetic core 9 has been shown as less than the outer diameter of the rotor segments, although in practice these would all lie on a common diameter to give a smooth rotor surface to generally avoid the problem of noise due to windage created by an uneven rotor surface.

The stator 2 and the rotor segments 10 are preferably built up from a stack of laminations of electrical sheet steel, as is conventional with electrical machines in general. It will be noted that all the rotor segments can be produced from the material inside the stator bore, providing for an efficient use of lamination material.

The rotor segments 10 can be held in place on the non-magnetic core 9 in any one of a variety of known methods, the method chosen for any one machine being dependent on such factors as the maximum speed and torque of the machine, the environmental conditions, etc. The methods include a mechanical dovetail arrangement (as shown in FIG. 1); using retainer bars which bear on a feature on the segments and which are secured to the core by bolts or other appropriate fasteners; molding or casting the segments into place; etc. After assembly of the rotor, the outer surface may be machined to the diameter which yields the desired air gap.

The stator poles are widened as they approach the air gap, the side of the widened section making a taper angle of 20° with respect to the main body of the pole. Values of taper angle between 15° and 45° may be found to be beneficial, depending on the parameters of a particular design.

The operation of the motor 1 will now be described with reference to FIGS. 3(a) and (b). As the coils 5 of one phase are energized, they direct magnetic flux along the corresponding first stator pole 3 on which the coil is wound. The flux paths 30 and 31 are shown schematically in FIG. 3(a). The flux then returns via the adjacent pair of stator poles 4. Because the return path for the flux is shared between two poles 4 then these poles 4 can be narrower than the first stator pole 3, without causing magnetic saturation. It will be noted that the flux paths are confined to the locality of the pole surrounded by the exciting coil. This is a benefit to the machine in that there is no need to provide magneto-motive force to drive flux around long back-iron regions of the stator or diametrically across the rotor.

Figure 3A:
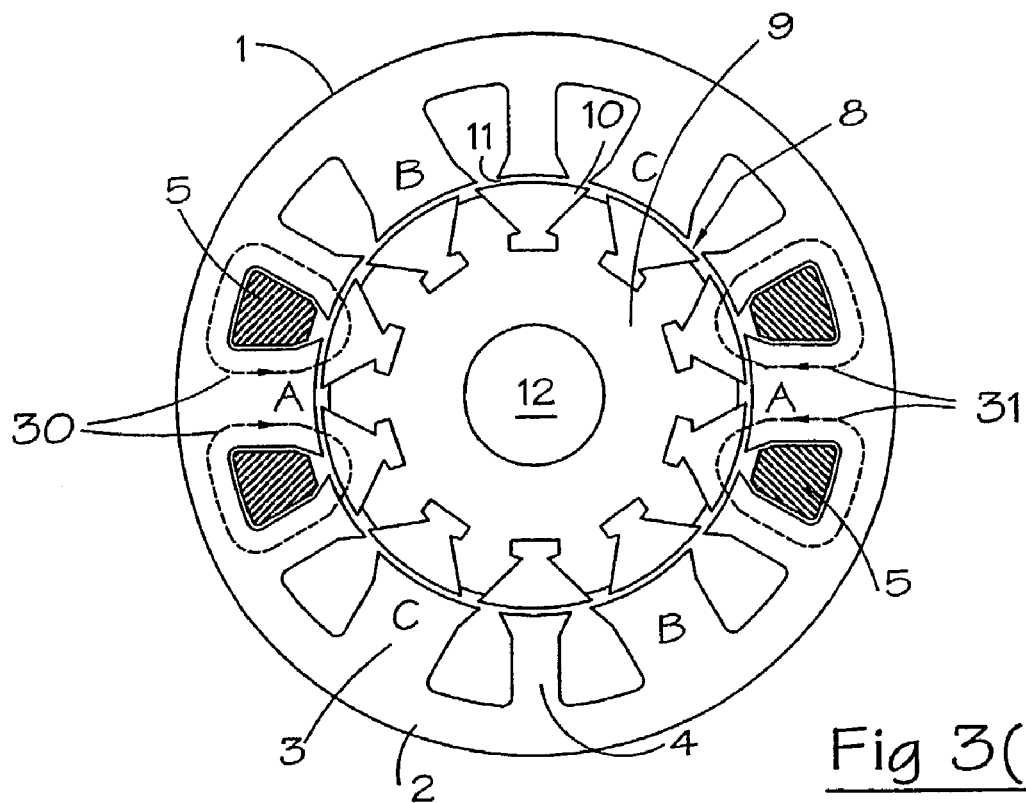
FIG. 3(a) shows magnetic flux lines for the aligned condition of the machine of FIG. 1, according to an embodiment of the invention.

When a rotor segment 10 is aligned with one side of the coil 5 as shown in FIG. 3(a), a second, adjacent segment is also aligned with the second side of the coil. The half of the magnetic flux produced by the coil is directed from the first stator pole 3 through the first rotor segment 10 to one of the adjacent second stator poles 4, and the other half of the flux is directed through the second rotor segment to the corresponding adjacent stator pole. The flux lines are shown schematically in FIG. 3(a). This arrangement has the effect of maximizing the magnetic flux linking the coil 5 and is therefore the maximum inductance position of the phase. As can be seen from FIG. 3(b), however, when the rotor segment 10 is aligned with the pole 3, the amount of magnetic flux linking the coil 5 is much less since the flux now has to cross to two adjacent rotor segments in order to return through poles 4. The rotor flux path now includes part of the non-magnetic core 9. This is therefore the minimum inductance position of the phase. At the position of maximum inductance (FIG. 3(a)) it is an advantage to maximize the lengths of the arcs of the pole faces of the stator poles and the rotor segments from the point of view of minimizing reluctance. As shown in FIG. 1, the arc of the stator poles 3 is increased at the air gap, without a consequent increase in the width of the pole body, by introducing a flared section at the end of the pole. However, it will be appreciated by the skilled person that minimizing reluctance by flaring the poles leads to increased fringing effects of the flux path near the air gap and will eventually lead to an unacceptable level of leakage flux from one stator pole to the other. Thus, there is a sensible limit on the extent to which adjacent stator pole arcs can be extended.

Figure 3B:
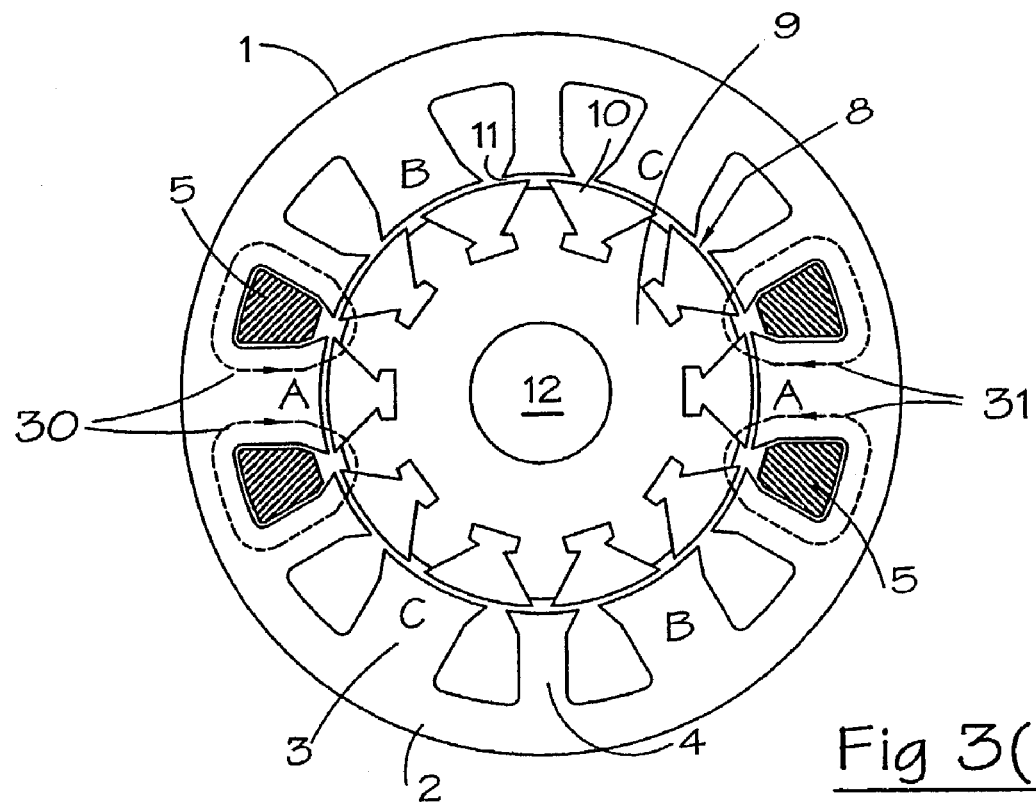
FIG. 3(b) shows magnetic flux lines for the unaligned condition of the machine of FIG. 1, according to an embodiment of the invention.

As a result, when the coil is excited, the rotor 8 seeks to align itself in the aligned condition shown in FIG. 3(a) as opposed to the unaligned condition of FIG. 3(b). Accordingly, by timing of the energization of the coils 5, 6, 7 of the three phases, the rotor 8 can be caused to develop torque in the desired sense relative to the stator 2.

For example, from the position shown in FIG. 3(b), exciting phase B will cause torque to be developed in a clockwise direction, whereas exciting phase C will develop anticlockwise torque. If the developed torque overcomes the load on the shaft 12, motion will result. The excitation patterns will then proceed in the way which is familiar to those skilled in the art of switched reluctance machines.

Figure 4:
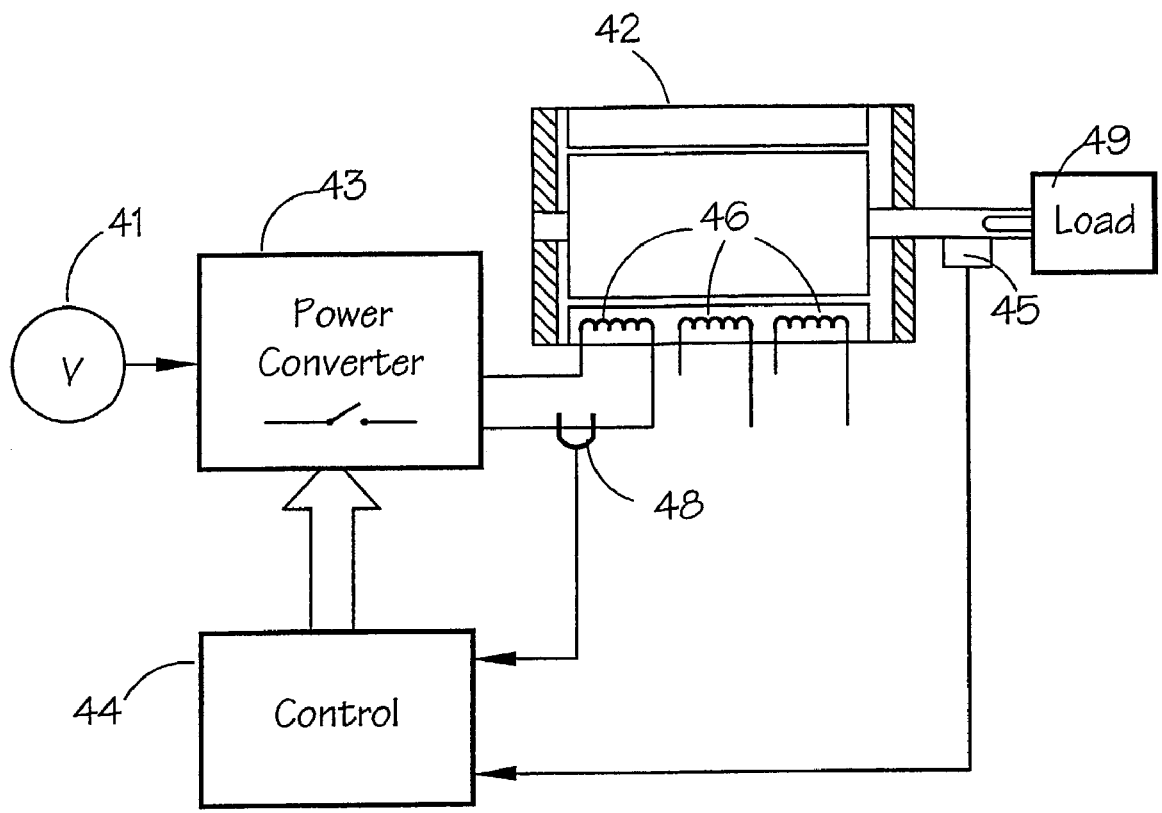
FIG. 4 is a schematic diagram of a switched reluctance drive, according to an embodiment of the invention.

It follows that this machine can be operated from a power converter and control system suitable for use with a conventionally constructed switched reluctance machine. A complete drive system incorporating the invention according to one embodiment is shown in FIG. 4. The drive system includes a DC power supply 41 that can be either a battery or rectified and filtered AC mains. The DC voltage provided by the power supply 41 is switched across phase windings 46 of the motor 42 by a power converter 43 under the control of the electronic control unit 44. Some form of current transducer 48 is normally provided to give phase current feedback. Rotor position information is provided by a transducer 45.

Figure 5:
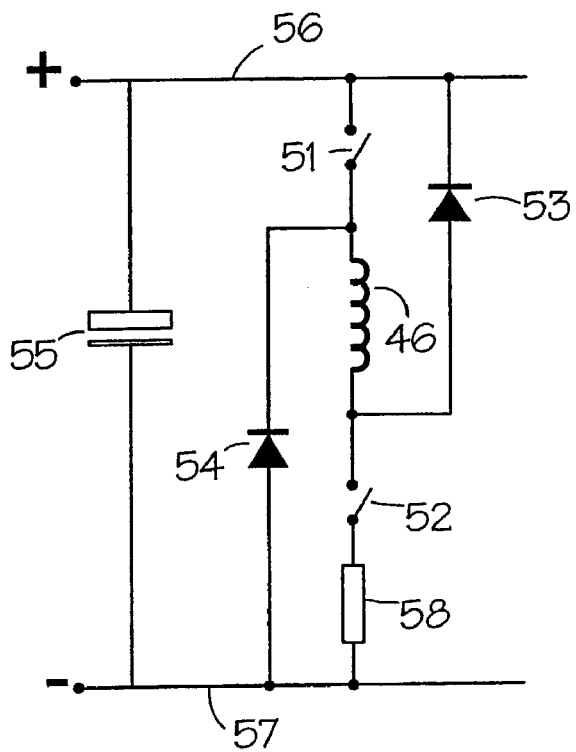
FIG. 5 shows a power switch topology suitable for use with the drive of FIG. 4, according to an embodiment of the invention.

FIG. 5 generally shows a typical switch circuit which may be used in the power converter 43 that controls the energization of the phase windings 46. The voltage rails 56, 57 are generally known as the DC link and the capacitor 55 across them is known as the DC link capacitor, whose function is to handle the alternating currents on the DC link. When switches 51 and 52 are closed, the phase winding is coupled to the source of DC power and is energized. When the phase winding of a switched reluctance machine is energized in the manner described above, the magnetic field set up by the flux in the magnetic circuit gives rise to the circumferential forces which, as described, act to pull the rotor poles into line with the stator poles. Energy return diodes 53 and 54 are provided to apply reverse voltage to the winding at the end of the energization period. A simple resistor 58 can be included to function as the current transducer 48 in FIG. 4.

Since the coils of the machine are short-pitched, i.e. only span one pole, they have short end-windings, as shown in FIG. 2. This greatly reduces the losses in the machine compared with the prior art and allows a greater output from a given volume of machine than has hitherto been the case.

It will be appreciated by persons skilled in the art that the above embodiments have been described by way of example only and not in any limitative sense. For example, although the above embodiments have been described in relation to electric motors, it will be understood that the invention could equally relate to electric generators. The number of poles and rotor segments may be varied. In addition, the coils of each phase can be connected in parallel with each other, and more or less than two coils can be provided for each phase. The rotor assembly may be designed so as to operate within the stator, or may adopt the so-called inverted structure where the rotor operates around the outside of the stator. Also, the stator is described as a set of pole profiles arranged as radially inwardly extending members from a contiguous back iron part. However, by the nature of the flux paths between adjacent stator poles, the back iron need only exist to create flux paths locally. Therefore, it is possible to construct a machine according to an embodiment of the present invention in which each adjacent pole group is arranged as a separate item with its own flux path. Thus, various alterations and modifications are possible without departure from the scope of the invention.

What is claimed is:

1. An apparatus comprising a switched reluctance machine that includes:
   a stator having a plurality of circumferentially spaced stator poles of soft magnetic material, said stator poles including a set of first stator poles and a set of second stator poles, wherein each circumferentially adjacent pair of said first stator poles has one of said second stator poles therebetween;
   a rotor supported for rotation relative to said stator, and having a plurality of rotor segments that are circumferentially spaced, that are each made of a soft magnetic material, and that are magnetically separated, wherein during relative rotation of said rotor and said stator, said rotor segments cause magnetic flux to flow between each said first stator pole and at least one of said second stator poles that is adjacent thereto; and
   a plurality of coils that are each associated with and extend around a single said stator pole that is a respective one of said first stator poles, each said coil being responsive to a flow of electric current therethrough for generating a magnetic flux in said first stator pole associated therewith.

2. An apparatus according to claim 1, wherein said second stator poles are free of coils.

3. An apparatus according to claim 1, wherein said coils define a set of phases, said phases each having a maximum inductance at a respective different angular position of said rotor.

4. An apparatus according to claim 1, wherein each said phase includes two of said coils that are disposed on diametrically opposite sides of said stator.

5. An apparatus according to claim 1, wherein the number of said stator poles is not an integer multiple of the number of said rotor segments.

6. An apparatus according to claim 1, wherein the number of said rotor segments is not an integer multiple of the number of said stator poles.

7. An apparatus according to claim 1, wherein at least one of said stator poles has an end nearest said rotor that is wider in a circumferential direction than a remainder of that stator pole.

8. An apparatus according to claim 1, wherein in a circumferential direction, said first stator poles are magnetically wide and said second stator poles are magnetically narrow.

9. An apparatus according to claim 8, wherein said first stator poles are approximately twice as magnetically wide as said second stator poles.

* * * * *